United States Patent
Lohr

(10) Patent No.: US 8,317,651 B2
(45) Date of Patent: Nov. 27, 2012

(54) ASSEMBLIES AND METHODS FOR CLAMPING FORCE GENERATION

(75) Inventor: Charles B. Lohr, Austin, TX (US)

(73) Assignee: Fallbrook Intellectual Property Company LLC, San Diego, CA (US)

( * ) Notice: Subject to any disclaimer, the term of this patent is extended or adjusted under 35 U.S.C. 154(b) by 709 days.

(21) Appl. No.: 12/437,396

(22) Filed: May 7, 2009

(65) Prior Publication Data

US 2009/0280949 A1 Nov. 12, 2009

Related U.S. Application Data

(60) Provisional application No. 61/051,248, filed on May 7, 2008.

(51) Int. Cl.
*F16H 15/38* (2006.01)
(52) U.S. Cl. .......... 476/42; 476/40; 384/446; 310/90.5
(58) Field of Classification Search .............. 476/40, 476/42; 310/90.5; 384/446
See application file for complete search history.

(56) References Cited

U.S. PATENT DOCUMENTS

| | | |
|---|---|---|
| 719,595 A | 2/1903 | Huss |
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,629,092 A | 5/1927 | Arter et al. |
| 1,629,902 A | 5/1927 | Arter et al. |
| 1,686,446 A | 10/1928 | Gilman |
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |

(Continued)

FOREIGN PATENT DOCUMENTS

CH 118064 12/1926

(Continued)

OTHER PUBLICATIONS

International Search Report and Written Opinion dated Feb. 2, 2010 from International Patent Application No. PCT/US2008/068929, filed on Jan. 7, 2008.

(Continued)

*Primary Examiner* — David M Fenstermacher
(74) *Attorney, Agent, or Firm* — Knobbe Martens Olson & Bear LLP

(57) ABSTRACT

Mechanisms and methods for clamping force generation are disclosed. In one embodiment, a clamping force generator system includes a permanent magnet bearing coupled to a traction ring and to a torque coupling. The traction ring can be provided with an electromagnetic bearing rotor and the torque coupling can be provided with an electromagnetic bearing stator. In some embodiments, a mechanical load cam, a permanent magnet bearing, and an electromagnetic bearing cooperate to generate a clamping force between the traction rings, the power rollers, and the idler. In other embodiments, a series of permanent magnet bearings and a mechanical bearing configured to produce a clamping force. In one embodiment an electromagnetic bearing is coupled to a control system and produces a specified clamping force that is associated with a torque transmitted in the transmission during operation. In some embodiments, a mechanical load cam produces a clamping force proportional to torque, while a permanent magnet bearing provides a minimum clamping force.

12 Claims, 5 Drawing Sheets

U.S. PATENT DOCUMENTS

| | | |
|---|---|---|
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Alain Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,209,254 A | 7/1940 | Ahnger |
| 2,259,933 A | 10/1941 | Holloway |
| 2,325,502 A | 7/1943 | Georges |
| 2,469,653 A | 5/1949 | Kopp |
| 2,480,968 A | 9/1949 | Ronal |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,874,592 A | 2/1959 | Oehrli |
| 2,883,883 A | 4/1959 | Chillson |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,048,056 A | 8/1962 | Wolfram |
| 3,087,348 A | 4/1963 | Kraus |
| 3,163,050 A | 12/1964 | Kraus |
| 3,176,542 A | 4/1965 | Monch |
| 3,184,983 A | 5/1965 | Kraus |
| 3,211,364 A | 10/1965 | Wentling et al. |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,407,687 A | 10/1968 | Hayashi |
| 3,440,895 A | 4/1969 | Fellows |
| 3,464,281 A | 9/1969 | Azuma Hiroshi et al. |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,996,807 A | 12/1976 | Adams |
| 4,103,514 A | 8/1978 | Grosse-Entrup |
| 4,169,609 A | 10/1979 | Zampedro |
| 4,177,683 A | 12/1979 | Moses |
| 4,227,712 A | 10/1980 | Dick |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,560,369 A | 12/1985 | Hattori |
| 4,574,649 A | 3/1986 | Seol |
| 4,585,429 A | 4/1986 | Marier |
| 4,630,839 A | 12/1986 | Seol |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,964,312 A | 10/1990 | Kraus |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schivelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,273,501 A | 12/1993 | Schievelbusch |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,451,070 A | 9/1995 | Lindsay et al. |
| 5,489,003 A | 2/1996 | Ohyama et al. |
| 5,508,574 A | 4/1996 | Vlock |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,690,346 A | 11/1997 | Keskitalo |
| 5,746,676 A | 5/1998 | Kawase et al. |
| 5,799,541 A | 9/1998 | Arbeiter |
| 5,823,052 A | 10/1998 | Nobumoto |
| 5,846,155 A | 12/1998 | Taniguchi et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,481 A | 4/2000 | Kumagai |
| 6,053,833 A | 4/2000 | Masaki |
| 6,053,841 A | 4/2000 | Kolde et al. |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,095,940 A | 8/2000 | Ai et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,312,358 B1 | 11/2001 | Goi et al. |
| 6,322,475 B2 | 11/2001 | Miller |
| 6,325,386 B1 | 12/2001 | Shoge |
| 6,375,412 B1 | 4/2002 | Dial |

| | | | | | | |
|---|---|---|---|---|---|---|
| 6,390,946 B1 | 5/2002 | Hibi et al. | 7,322,901 B2 | 1/2008 | Miller et al. | |
| 6,406,399 B1 | 6/2002 | Ai | 7,384,370 B2 | 6/2008 | Miller | |
| 6,419,608 B1 | 7/2002 | Miller | 7,393,300 B2 | 7/2008 | Miller et al. | |
| 6,425,838 B1 | 7/2002 | Matsubara et al. | 7,393,302 B2 | 7/2008 | Miller | |
| 6,461,268 B1 | 10/2002 | Milner | 7,393,303 B2 | 7/2008 | Miller | |
| 6,492,785 B1 | 12/2002 | Kasten et al. | 7,395,731 B2 | 7/2008 | Miller et al. | |
| 6,499,373 B2 | 12/2002 | Van Cor | 7,396,209 B2 | 7/2008 | Miller et al. | |
| 6,532,890 B2 | 3/2003 | Chen | 7,402,122 B2 | 7/2008 | Miller | |
| 6,551,210 B2 | 4/2003 | Miller | 7,410,443 B2 | 8/2008 | Miller | |
| 6,575,047 B2 | 6/2003 | Reik et al. | 7,419,451 B2 | 9/2008 | Miller | |
| 6,672,418 B1 | 1/2004 | Makino | 7,422,541 B2 | 9/2008 | Miller | |
| 6,676,559 B2 | 1/2004 | Miller | 7,422,546 B2 | 9/2008 | Miller et al. | |
| 6,679,109 B2 | 1/2004 | Gierling et al. | 7,427,253 B2 | 9/2008 | Miller | |
| 6,689,012 B2 | 2/2004 | Miller | 7,431,677 B2 | 10/2008 | Miller et al. | |
| 6,805,654 B2 | 10/2004 | Nishii | 7,452,297 B2 | 11/2008 | Miller et al. | |
| 6,931,316 B2 | 8/2005 | Joe et al. | 7,455,611 B2 | 11/2008 | Miller et al. | |
| 6,942,593 B2 | 9/2005 | Nishii et al. | 7,455,617 B2 | 11/2008 | Miller et al. | |
| 6,945,903 B2 | 9/2005 | Miller | 7,462,123 B2 | 12/2008 | Miller et al. | |
| 6,949,049 B2 | 9/2005 | Miller | 7,462,127 B2 | 12/2008 | Miller et al. | |
| 6,991,579 B2 | 1/2006 | Kobayashi et al. | 7,470,210 B2 | 12/2008 | Miller et al. | |
| 7,011,600 B2 | 3/2006 | Miller et al. | 7,481,736 B2 | 1/2009 | Miller et al. | |
| 7,011,601 B2 | 3/2006 | Miller | 7,510,499 B2 | 3/2009 | Miller et al. | |
| 7,014,591 B2 | 3/2006 | Miller | 7,540,818 B2 | 6/2009 | Miller et al. | |
| 7,029,418 B2 | 4/2006 | Taketsuna et al. | 7,727,115 B2 | 6/2010 | Serkh | |
| 7,032,914 B2 | 4/2006 | Miller | 2001/0008192 A1 | 7/2001 | Morisawa | |
| 7,036,620 B2 | 5/2006 | Miller et al. | 2003/0022753 A1 | 1/2003 | Mizuno et al. | |
| 7,044,884 B2 | 5/2006 | Miller | 2003/0036456 A1 | 2/2003 | Skrabs | |
| 7,063,640 B2 | 6/2006 | Miller | 2003/0221892 A1 | 12/2003 | Matsumoto et al. | |
| 7,074,007 B2 | 7/2006 | Miller | 2004/0058772 A1* | 3/2004 | Inoue et al. | 475/207 |
| 7,074,154 B2 | 7/2006 | Miller | 2004/0119345 A1 | 6/2004 | Takano | |
| 7,074,155 B2 | 7/2006 | Miller | 2004/0204283 A1 | 10/2004 | Inoue | |
| 7,086,979 B2 | 8/2006 | Frenken | 2005/0037876 A1 | 2/2005 | Unno et al. | |
| 7,111,860 B1 | 9/2006 | Grimaldos | 2005/0227809 A1 | 10/2005 | Bitzer et al. | |
| 7,112,158 B2 | 9/2006 | Miller | 2006/0052204 A1 | 3/2006 | Eckert et al. | |
| 7,112,159 B2 | 9/2006 | Miller et al. | 2006/0084549 A1 | 4/2006 | Smithson et al. | |
| 7,125,297 B2 | 10/2006 | Miller et al. | 2006/0108956 A1 | 5/2006 | Clark | |
| 7,131,930 B2 | 11/2006 | Miller et al. | 2006/0111212 A9 | 5/2006 | Ai et al. | |
| 7,140,999 B2 | 11/2006 | Miller | 2006/0180363 A1 | 8/2006 | Uchisasai | |
| 7,147,586 B2 | 12/2006 | Miller et al. | 2007/0004552 A1 | 1/2007 | Matsudaira et al. | |
| 7,153,233 B2 | 12/2006 | Miller et al. | 2007/0049450 A1 | 3/2007 | Miller | |
| 7,156,770 B2 | 1/2007 | Miller | 2007/0142161 A1 | 6/2007 | Miller | |
| 7,160,222 B2 | 1/2007 | Miller | 2007/0155567 A1 | 7/2007 | Miller et al. | |
| 7,163,485 B2 | 1/2007 | Miller | 2007/0155580 A1 | 7/2007 | Nichols et al. | |
| 7,163,486 B2 | 1/2007 | Miller et al. | 2007/0200443 A1* | 8/2007 | Baudelocque et al. | 310/90.5 |
| 7,166,052 B2 | 1/2007 | Miller et al. | 2008/0032852 A1 | 2/2008 | Smithson et al. | |
| 7,166,056 B2 | 1/2007 | Miller et al. | 2008/0032853 A1 | 2/2008 | Smithson et al. | |
| 7,166,057 B2 | 1/2007 | Miller et al. | 2008/0032854 A1 | 2/2008 | Smithson et al. | |
| 7,166,058 B2 | 1/2007 | Miller et al. | 2008/0034585 A1 | 2/2008 | Smithson et al. | |
| 7,169,076 B2 | 1/2007 | Miller et al. | 2008/0034586 A1 | 2/2008 | Smithson et al. | |
| 7,172,529 B2 | 2/2007 | Miller et al. | 2008/0039269 A1 | 2/2008 | Smithson et al. | |
| 7,175,564 B2 | 2/2007 | Miller | 2008/0039270 A1 | 2/2008 | Smithson et al. | |
| 7,175,565 B2 | 2/2007 | Miller et al. | 2008/0039271 A1 | 2/2008 | Smithson et al. | |
| 7,175,566 B2 | 2/2007 | Miller et al. | 2008/0039272 A1 | 2/2008 | Smithson et al. | |
| 7,192,381 B2 | 3/2007 | Miller et al. | 2008/0039273 A1 | 2/2008 | Smithson et al. | |
| 7,197,915 B2 | 4/2007 | Luh et al. | 2008/0039274 A1 | 2/2008 | Smithson et al. | |
| 7,198,582 B2 | 4/2007 | Miller et al. | 2008/0039275 A1 | 2/2008 | Smithson et al. | |
| 7,198,583 B2 | 4/2007 | Miller et al. | 2008/0039276 A1 | 2/2008 | Smithson et al. | |
| 7,198,584 B2 | 4/2007 | Miller et al. | 2008/0039277 A1 | 2/2008 | Smithson et al. | |
| 7,198,585 B2 | 4/2007 | Miller et al. | 2008/0040008 A1 | 2/2008 | Smithson et al. | |
| 7,201,693 B2 | 4/2007 | Miller et al. | 2008/0073993 A1* | 3/2008 | Sortore et al. | 310/90.5 |
| 7,201,694 B2 | 4/2007 | Miller et al. | 2008/0121487 A1 | 5/2008 | Miller et al. | |
| 7,201,695 B2 | 4/2007 | Miller et al. | 2008/0125281 A1 | 5/2008 | Miller et al. | |
| 7,204,777 B2 | 4/2007 | Miller et al. | 2008/0125282 A1 | 5/2008 | Miller et al. | |
| 7,214,159 B2 | 5/2007 | Miller et al. | 2008/0132373 A1 | 6/2008 | Miller et al. | |
| 7,217,215 B2 | 5/2007 | Miller et al. | 2008/0132377 A1 | 6/2008 | Miller et al. | |
| 7,217,219 B2 | 5/2007 | Miller | 2008/0139363 A1 | 6/2008 | Williams | |
| 7,217,220 B2 | 5/2007 | Careau et al. | 2008/0141809 A1 | 6/2008 | Miller et al. | |
| 7,232,395 B2 | 6/2007 | Miller et al. | 2008/0141810 A1 | 6/2008 | Miller et al. | |
| 7,235,031 B2 | 6/2007 | Miller et al. | 2008/0146403 A1 | 6/2008 | Miller | |
| 7,238,136 B2 | 7/2007 | Miller et al. | 2008/0146404 A1 | 6/2008 | Miller | |
| 7,238,137 B2 | 7/2007 | Miller et al. | 2008/0161151 A1 | 7/2008 | Miller | |
| 7,238,138 B2 | 7/2007 | Miller et al. | 2008/0188345 A1 | 8/2008 | Miller | |
| 7,246,672 B2 | 7/2007 | Shirai et al. | 2008/0200300 A1 | 8/2008 | Smithson et al. | |
| 7,250,018 B2 | 7/2007 | Miller et al. | 2008/0236319 A1 | 10/2008 | Nichols et al. | |
| 7,261,663 B2 | 8/2007 | Miller et al. | 2008/0248917 A1 | 10/2008 | Nichols et al. | |
| 7,275,610 B2 | 10/2007 | Kuang et al. | 2008/0261771 A1 | 10/2008 | Nichols et al. | |
| 7,285,068 B2 | 10/2007 | Hosoi | 2008/0305920 A1* | 12/2008 | Nishii et al. | 476/42 |
| 7,288,042 B2 | 10/2007 | Miller et al. | 2009/0107454 A1 | 4/2009 | Hiyoshi et al. | |
| 7,320,660 B2 | 1/2008 | Miller | 2009/0164076 A1 | 6/2009 | Vasiliotis et al. | |

| | | | |
|---|---|---|---|
| 2009/0189397 A1 | 7/2009 | Miller et al. | |
| 2009/0312145 A1 | 12/2009 | Pohl et al. | |
| 2010/0056322 A1 | 3/2010 | Thomassy | |
| 2010/0093479 A1 | 4/2010 | Carter et al. | |
| 2010/0093480 A1 | 4/2010 | Pohl et al. | |
| 2010/0093485 A1 | 4/2010 | Pohl et al. | |
| 2010/0131164 A1 | 5/2010 | Carter et al. | |
| 2010/0264620 A1 | 10/2010 | Miles et al. | |
| 2010/0267510 A1 | 10/2010 | Nichols et al. | |
| 2011/0088503 A1 | 4/2011 | Armstrong et al. | |
| 2011/0105274 A1 | 5/2011 | Lohr et al. | |
| 2011/0127096 A1 | 6/2011 | Schneidewind | |
| 2011/0172050 A1 | 7/2011 | Nichols et al. | |
| 2011/0218072 A1 | 9/2011 | Lohr et al. | |
| 2011/0230297 A1 | 9/2011 | Shiina et al. | |
| 2011/0319222 A1 | 12/2011 | Ogawa et al. | |
| 2012/0035016 A1 | 2/2012 | Miller et al. | |
| 2012/0043841 A1 | 2/2012 | Miller | |

FOREIGN PATENT DOCUMENTS

| | | | |
|---|---|---|---|
| CN | 1157379 A | | 8/1997 |
| DE | 498 701 | | 5/1930 |
| DE | 1171692 | | 6/1964 |
| DE | 2 310880 | | 9/1974 |
| DE | 2 136 243 | | 1/1975 |
| DE | 2436496 | | 2/1975 |
| DE | 39 40 919 | A1 | 6/1991 |
| DE | 19851738 | | 5/2000 |
| DE | 10155372 | A1 | 5/2003 |
| EP | 0 432 742 | | 12/1990 |
| EP | 0528382 | | 2/1993 |
| EP | 635639 | A1 | 1/1995 |
| EP | 0638741 | | 2/1995 |
| EP | 0976956 | | 2/2000 |
| EP | 1136724 | | 9/2001 |
| EP | 1366978 | | 3/2003 |
| FR | 620375 | | 4/1927 |
| FR | 2590638 | | 5/1987 |
| GB | 391448 | | 4/1933 |
| GB | 592320 | | 9/1947 |
| GB | 906 002 | A | 9/1962 |
| GB | 919430 | A | 2/1963 |
| GB | 1132473 | | 11/1968 |
| GB | 1165545 | | 10/1969 |
| GB | 1 376 057 | | 12/1974 |
| GB | 2031822 | | 4/1980 |
| GB | 2 035 482 | | 6/1980 |
| GB | 2 080 452 | | 8/1982 |
| JP | 42-2843 | | 2/1942 |
| JP | 42-2844 | | 2/1967 |
| JP | 47-29762 | | 11/1972 |
| JP | 48-54371 | | 7/1973 |
| JP | 49-12742 | | 3/1974 |
| JP | 50-114581 | | 9/1975 |
| JP | 51-25903 | | 8/1976 |
| JP | 51-150380 | | 12/1976 |
| JP | 47-20535 | | 8/1977 |
| JP | 53 048166 | | 1/1978 |
| JP | 55-135259 | | 4/1979 |
| JP | 58065361 | | 4/1983 |
| JP | 59069565 | | 4/1984 |
| JP | 60-247011 | | 12/1985 |
| JP | 61-144466 | | 7/1986 |
| JP | 61-173722 | | 10/1986 |
| JP | 63-219953 | | 9/1988 |
| JP | 63219953 | | 9/1988 |
| JP | 63-160465 | | 10/1988 |
| JP | 02157483 | | 6/1990 |
| JP | 02271142 | | 6/1990 |
| JP | 04-166619 | | 6/1992 |
| JP | 04-272553 | | 9/1992 |
| JP | 52-35481 | | 9/1993 |
| JP | 7-42799 | | 2/1995 |
| JP | 7-139600 | | 5/1995 |
| JP | 08170706 | A | 7/1996 |
| JP | 09024743 | A | 1/1997 |
| JP | 09-089064 | | 3/1997 |
| JP | 411063130 | | 3/1999 |
| JP | 11-257479 | | 9/1999 |
| JP | 2001521109 | A | 11/2001 |
| JP | 2002-147558 | | 5/2002 |
| JP | 2002-250421 | | 6/2002 |
| JP | 2003-028257 | | 1/2003 |
| JP | 2003-524119 | | 8/2003 |
| JP | 2003-336732 | | 11/2003 |
| JP | 2004162652 | A | 6/2004 |
| JP | 8-247245 | | 9/2004 |
| JP | 2005/240928 | A | 9/2005 |
| JP | 2006015025 | | 1/2006 |
| JP | 2007-535715 | | 12/2007 |
| JP | 2008-002687 | | 1/2008 |
| JP | 03-149442 | | 1/2009 |
| JP | 2010069005 | | 4/2010 |
| NE | 98467 | | 7/1961 |
| TW | 582363 | | 4/2004 |
| TW | 590955 | | 6/2004 |
| WO | WO 01/73319 | | 10/2001 |
| WO | WO 02/088573 | | 11/2002 |
| WO | WO 03100294 | | 12/2003 |
| WO | WO 2005/083305 | | 9/2005 |
| WO | WO 2009/157920 | | 12/2009 |
| WO | WO2010/017242 | | 2/2010 |
| WO | WO 2010/024809 | | 3/2010 |
| WO | WO 2010/044778 | | 4/2010 |
| WO | WO 2011/101991 | | 8/2011 |

OTHER PUBLICATIONS

Office Action dated Feb. 12, 2010 from Japanese Patent Application No. 2009-294086.

Office Action dated Feb. 17, 2010 from Japanese Patent Application No. 2006-508892.

Thomassy: An Engineering Approach to Simulating Traction EHL. CVT-Hybrid International Conference Mecc/Maastricht/The Netherlands, Nov. 17-19, 2010, p. 97.

* cited by examiner

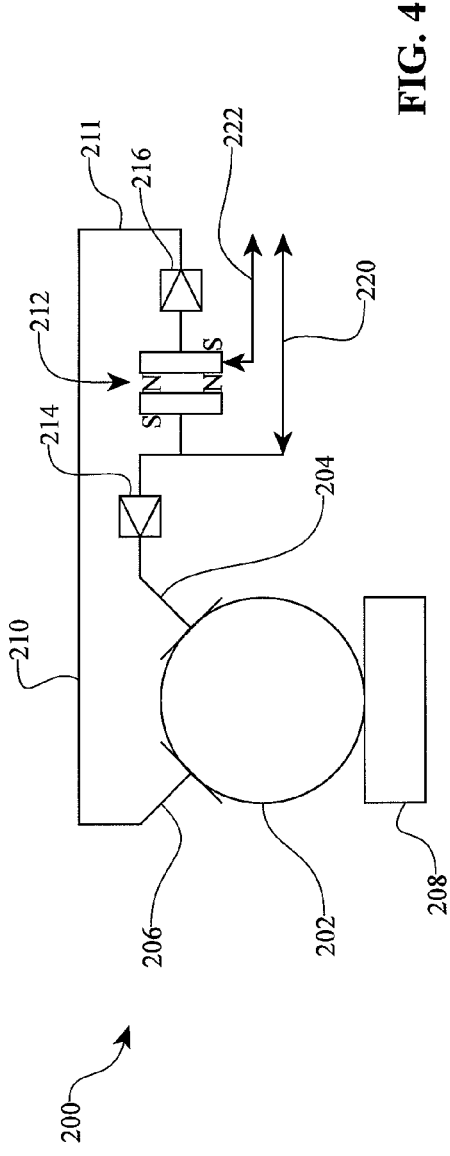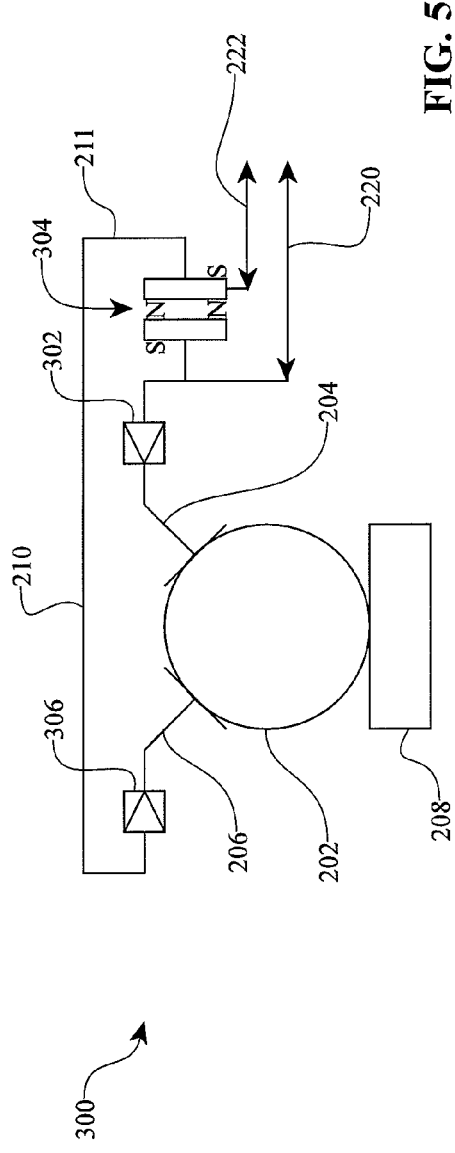

ASSEMBLIES AND METHODS FOR CLAMPING FORCE GENERATION

CROSS REFERENCE TO RELATED APPLICATIONS

This application claims the benefit of U.S. Provisional Patent Application No. 61/051,248, filed on May 7, 2008, which is hereby incorporated by reference in its entirety.

BACKGROUND OF THE INVENTION

1. Field of the Invention

The field of the invention relates generally to mechanical power transmissions, and more particularly the invention pertains to devices and methods relating to generating clamping force in certain types of said transmissions.

2. Description of the Related Art

Certain transmissions, for example some continuously or infinitely variable transmissions, often include one or more mechanisms for generating a clamping force that facilitates the transmission of torque between or among transmission components via traction or friction. Some clamping force generators are referred to as axial force generators (AFGs) because, typically, the clamping force produced by the AFGs resolves (or must be reacted) along a main or longitudinal axis of a transmission. Hence, as used here, references to clamping force generation or clamping force generators will be understood as including axial force generation or AFGs.

One known method of generating clamping force is to place rollers between a set of load cams (or load ramps) and a reacting surface, such as for example another set of load cams or a flat driven or driving surface. As the relative motion between the opposing surfaces drives the rollers up the ramps, the rollers act to push apart the opposing surfaces. Since the opposing surfaces are typically substantially constrained to react the pushing of the rollers, a clamping force arises in the assembly. The clamping force is then usually transmitted to tractive or frictional torque transmission components.

However, devising the proper clamping force generator for any given application can be challenging. For example, difficulties can arise in providing the adequate pre-load (or initial clamping force) necessary to avoid total traction loss and/or inefficiencies (due to lost motion, for example). Hence, there are continuing needs in the relevant technology for clamping force generating mechanisms and/or methods to provide adequate clamping force for various operating conditions of certain transmissions. The devices and methods disclosed here address at least some of these needs.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a continuously variable transmission (CVT) having a group of spherical power rollers in contact with first and second traction rings and a support member. The CVT has a permanent magnet bearing coupled to the first traction ring. The permanent magnet bearing is coupled to the second traction ring. The CVT also has an electromagnetic bearing coupled to the first and second traction rings. The electromagnetic bearing is configured to generate an axial force between the power rollers, support member, and the first and second traction rings.

Another aspect of the invention concerns a method of controlling an axial force in a continuously variable transmission (CVT). The CVT has a group of spherical power rollers in contact with a first traction ring, a second traction ring, and a support member. The method includes the step of providing an electromagnetic bearing coupled to the first and second traction ring. The method also includes the step of adjusting the electromagnetic bearing to provide an axial force between the power rollers, the support member, the first and second traction rings. In one embodiment, the axial force is based at least in part on an operating condition of the CVT.

Yet another aspect of the invention concerns a continuously variable transmission (CVT) having a group of spherical power rollers in contact with a support member, a first traction ring, and a second traction ring. The CVT includes at least one mechanical load cam. In one embodiment, the CVT includes a permanent magnet bearing operably coupled to the mechanical load cam. In some embodiments, the CVT has a second mechanical load cam coupled to the permanent magnet bearing. The second mechanical load cam is coupled to the second traction.

BRIEF DESCRIPTION OF THE FIGURES

FIG. 4 is a schematic view of a CVT that uses another inventive embodiment of a mechanical load cam and magnetic clamping force generation system.

FIG. 5 is a schematic view of a CVT that uses yet one more embodiment of a mechanical load cam and magnetic clamping force generation system.

DETAILED DESCRIPTION OF CERTAIN INVENTIVE EMBODIMENTS

The preferred embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. Embodiments of the clamping force generators described here can be suitably adapted to continuously variable transmissions of the type disclosed in U.S. Pat. Nos. 6,241,636; 6,419,608; 6,689,012; 7,011,600; and PCT Patent Application Nos. PCT/US2007/023313, for example. The entire disclosure of each of these patents and patent application is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology. As used here, the terms "axial," "axially," "lateral," "laterally," refer to a position or direction that is coaxial or parallel with a longitudinal axis of a transmission or variator. The terms "radial" and "radially" refer to locations or directions that extend perpendicularly from the longitudinal axis.

Figure 1:
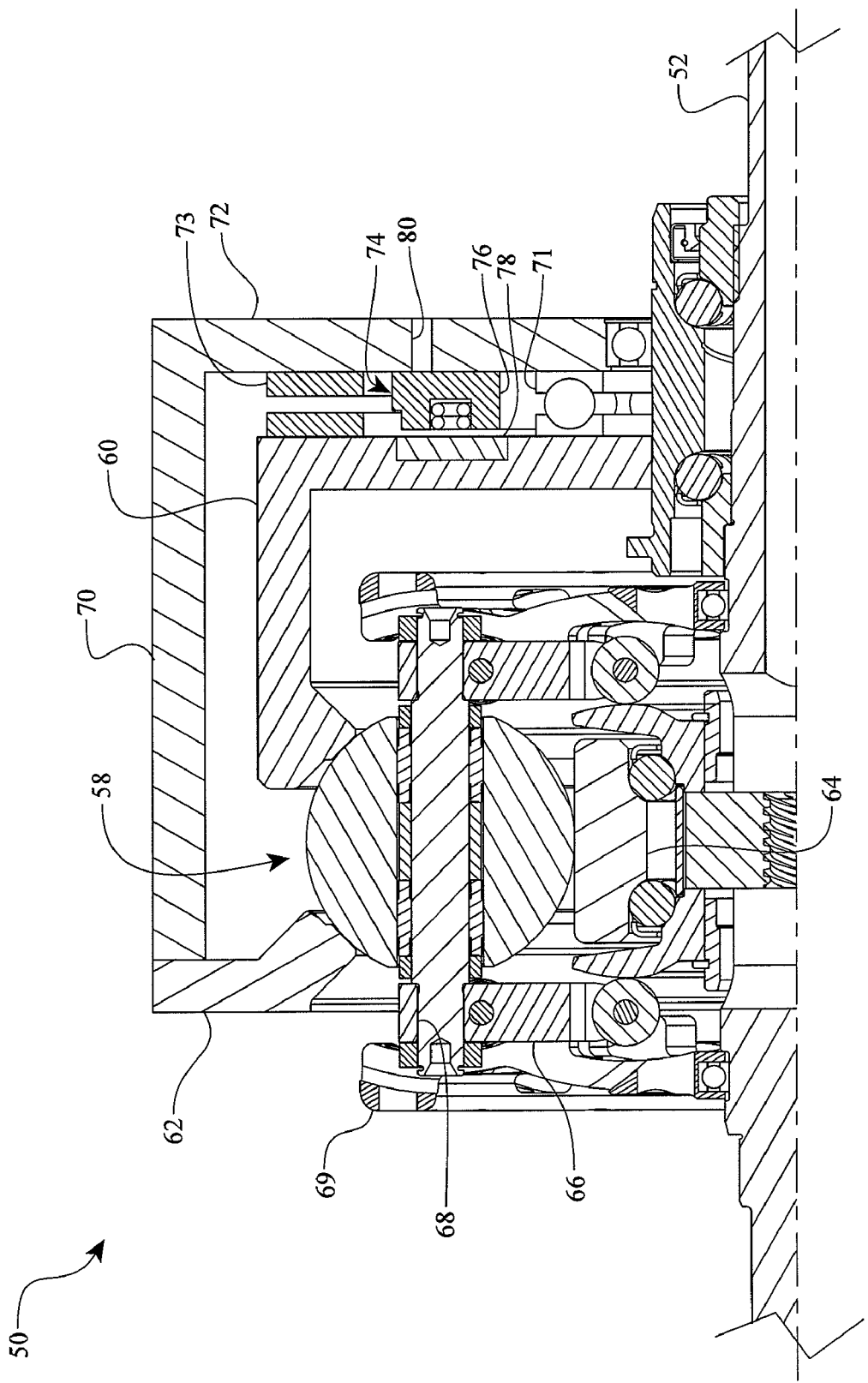
FIG. 1 is a cross-section of an exemplary continuously variable transmission (CVT) that uses an electromagnetic clamping force generation system.

Referencing FIG. 1 now, it illustrates a spherical-type CVT 50 that can be used to change the ratio of input speed to output speed. The CVT 50 has a main axle 52 extending through the center of the CVT 50. The main axle 52 provides axial and radial positioning and support for other components of the CVT 50. For purposes of description, the main axle 52 defines a longitudinal axis of the CVT 50 that will serve as a reference point for describing the location and or motion of other components of the CVT 50. In some embodiments, the CVT 50 can be coupled to, and enclosed in, a housing (not shown). The housing can be adapted to be non-rotatable or rotatable about the longitudinal axis.

The CVT 50 includes a number of power rollers 58 arranged angularly about the main axle 52 and placed in contact with a first traction ring 60, a second traction ring 62, and a support member 64. Legs 66 can couple to power roller axles 68, which provide tiltable axes of rotation for the power rollers 58. The power roller axles 68 can be supported in and/or reacted by a carrier 69. The tilting of the power roller axles 68 causes the radii (relative to the power roller axles 68) at the point of contact between the power rollers 58 and the traction rings 60, 62 to change, thereby changing the ratio of output speed to input speed and the ratio of output torque to input torque.

Embodiments of the CVT 50 often use a clamping force generation mechanism (clamping force generator or CFG) to prevent slip between the power rollers 58 and the traction rings 60, 62 when transmitting certain levels of torque. By way of example, at low torque input it is possible for the traction ring 60 to slip on the power rollers 58, rather than to achieve traction. In some embodiments, clamping force generation includes providing preloading, such as by way of one or more of an axial spring (for example, a wave spring), a torsion spring, a compression coil spring, or a tension coil spring.

Figure 2:
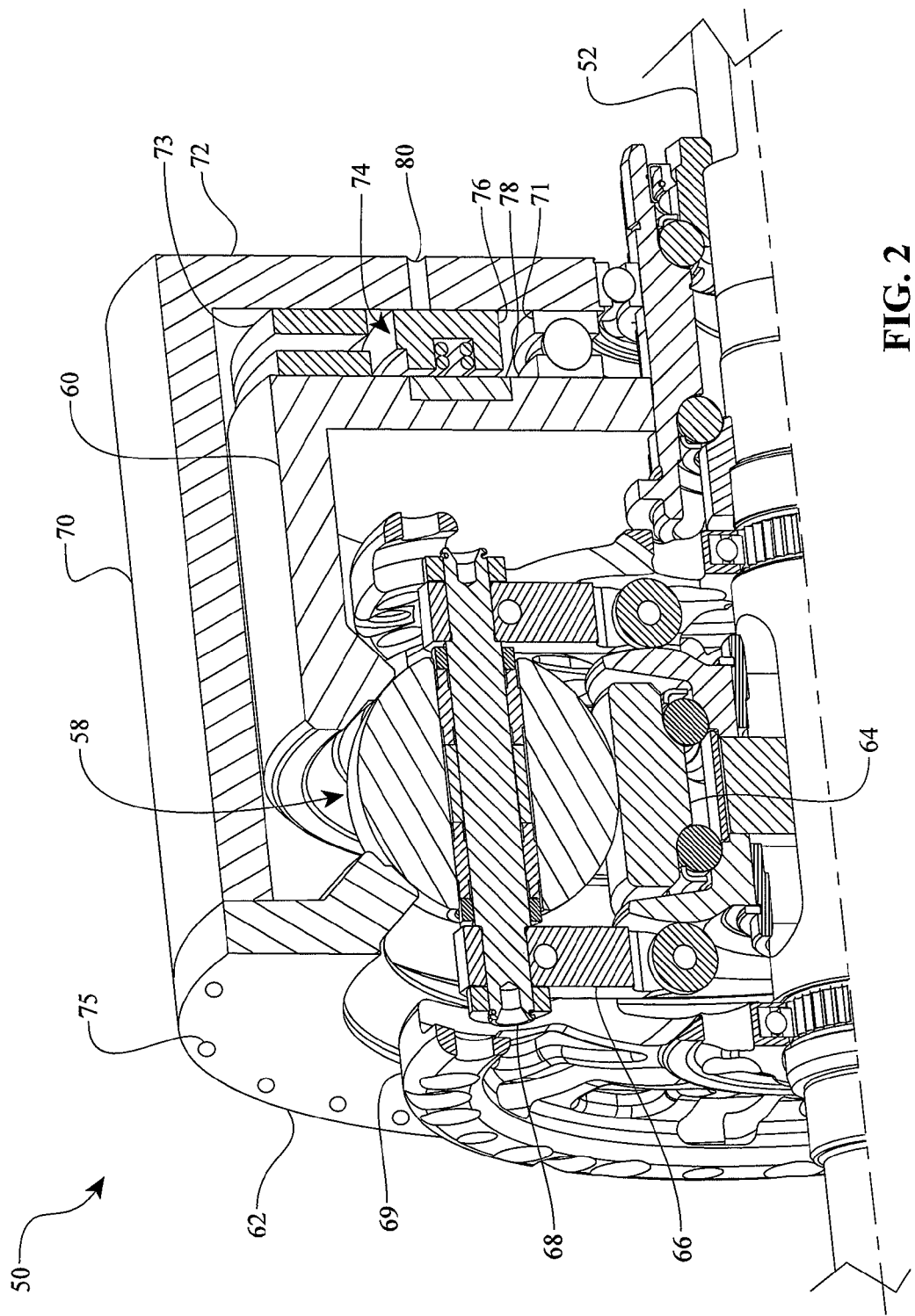
FIG. 2 is a partial cross-sectioned, perspective view of the CVT of FIG. 1.

Referring to FIGS. 1 and 2, the CVT 50 can include a torque coupling 70 connected to the second traction ring 62 with, for example, common fasteners via fastener holes 75. The torque coupling 70 can be provided with an axial thrust flange 72 that extends radially inward from the torque coupling 70. The CVT 50 can include an anti-friction bearing 71 coupled to the axial thrust flange 72 and coupled to the first traction ring 60. In one embodiment, a permanent magnet bearing 73 is coupled to the axial thrust flange 72 and coupled to the first traction ring 60. The permanent magnet bearing 73 can be arranged to provide axial force between the axial thrust flange 72 and the first traction ring 60.

The CVT 50 can be provided with an electromagnetic bearing 74. The electromagnetic bearing 74 can be, for example, similar to the axial electromagnetic bearing disclosed in U.S. Pat. No. 4,180,296, the entire disclosure of which is hereby incorporated herein by reference. The electromagnetic bearing 74 can include an electromagnetic bearing stator 76 configured to magnetically communicate with an electromagnetic bearing rotor 78. In one embodiment, the electromagnetic bearing rotor 78 is integral with the first traction ring 60. In other embodiments, the electromagnetic bearing rotor 78 is a separate component that is fixedly attached to the first traction ring 60. In one embodiment, the axial thrust flange 72 is provided with a conductor passage 80 to provide electrical conductor access to the electromagnetic bearing stator 76. In some embodiments, the axial thrust flange 72, the torque coupling 70, and the second traction ring 62 are substantially non-rotatable. In other embodiments, the axial thrust flange 72, the torque coupling 70, and the second traction ring 62 are configured to rotate about the longitudinal axis. In some embodiments, the permanent magnet bearing 73, the anti-friction bearing 71, and the electromagnetic bearing 74 are arranged coaxially about the longitudinal axis of the CVT 50. It should be readily apparent to a person having ordinary skill in the relevant technology that the radial position of the permanent magnet bearing 73, the anti-friction bearing 71, and the electromagnetic bearing 74 can be modified or adapted to suit a particular application or packaging in the CVT 50.

During operation of CVT 50, the anti-friction bearing 71 and the permanent magnet bearing 73 can be configured to provide a minimum, and substantially constant, clamp force between the power rollers 58, the traction rings 60 and 62, and the idler 64. The electromagnetic bearing 74 can be coupled to a control system (not shown). The control system can adjust the axial force provided by the electromagnetic bearing 74 proportionally to the operating condition in the CVT 50. For example, the control system can be configured to receive signals from the CVT 50 that are either measured directly or indirectly, and manipulate the signals either through an algorithm, look-up table, or an electromechanical means, to determine a specified clamp force, for example an optimum clamping force. The signals can include torque, temperature, and/or component speed. The control system can also be configured to receive information such as component geometry of the CVT 50, and/or other factors or variables that can influence the traction capacity between the power rollers 58, the traction rings 60 and 62, and the idler 64. The axial force provided by the electromagnetic bearing 74 can be adapted to dynamically change in response to a change in operating condition of the CVT 50. This method of operation ensures that a specified clamp force, for example a substantially optimal clamp force between the power rollers 58, the traction rings 60 and 62, and the idler 64 is achieved, which optimizes the operating efficiency of the CVT 50.

Figure 3:
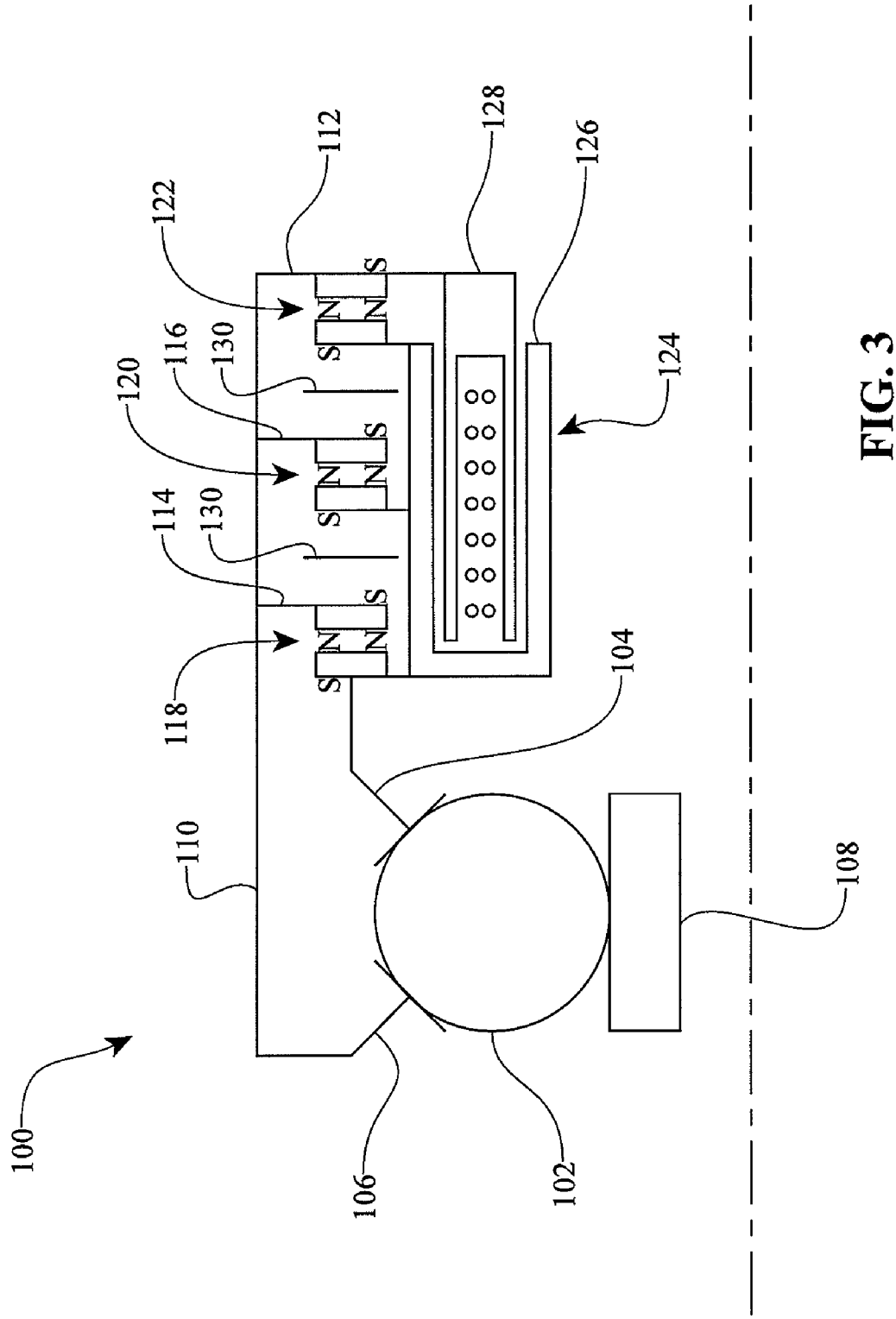
FIG. 3 is a schematic view of a CVT that uses an embodiment of an electromagnetic clamping force generation system in accordance with the inventive principles disclosed herein.

Turning now to FIG. 3, in one embodiment, a CVT 100 can include a number of power rollers 102 coupled to a first traction ring 104, a second traction ring 106, and an idler 108. The CVT 100 is substantially similar in various respects to the CVT 50. For simplification, the CVT 100 is shown in a schematic representation in FIG. 3. A torque coupling 110 can be coupled to the second traction ring 106, which is similar in some aspects to the torque coupling 70. The torque coupling 110 can be provided with an axial thrust flange 112. In some embodiments, the torque coupling 110 can be provided with multiple support flanges 114 and 116. The support flanges 114 and 116 can be configured to couple to permanent magnet bearings 118 and 120, respectively. The permanent magnet bearings 118 and 120 are further coupled to the first traction ring 104. The CVT 100 can be provided with a permanent magnet bearing 122 that is coupled to the axial thrust flange 112. The permanent magnet bearing 122 can be further coupled to the first traction ring 104. The permanent magnet bearings 118, 120, and 122 can be arranged coaxially about the longitudinal axis. In one embodiment, the permanent magnet bearings 118, 120, and 122 are axially separated by lead rings 130. The lead rings 130 provide magnetic isolation between the permanent magnet bearings 118, 120, and 122.

In one embodiment, the CVT 100 includes an electromagnetic bearing 124 that is similar in some respects to the electromagnetic bearing 74. The electromagnetic bearing 124 can include an electromagnetic bearing rotor 126 coupled to electromagnetic bearing stator 128. In some embodiments, the electromagnetic bearing rotor 126 is configured to couple to each of the permanent magnet bearings 118, 120, and 122. The electromagnetic bearing rotor 126 can be further coupled to the first traction ring 104. The electromagnetic bearing stator 128 can be configured to couple to the axial thrust flange 112.

During operation, the permanent magnets 118, 120, 122, and the electromagnetic bearing 124 cooperate to provide a clamping force between the first traction ring 104, the second traction ring 106, and the idler 108. In some embodiments, the electromagnetic bearing 124 is coupled to a control system (not shown), that adjusts the axial force provided by the electromagnetic bearing in response to torque transferred in the CVT 100.

Passing now to FIG. 4, in one embodiment a CVT 200 can include a number of power rollers 202 in contact with a first traction ring 204, a second traction ring 206, and an idler 208 in a substantially similar manner as shown with the CVT 50. The CVT 200 can include a torque coupling 210 that can be connected to the second traction ring 206. The torque coupling 210 can be provided with an axial thrust flange 211. In one embodiment, the CVT 200 can include a first mechanical load cam 214 coupled to the first traction ring 204. The first mechanical load cam 214 can be configured to produce axial force between the first traction ring 204 and a permanent magnet bearing 212. The permanent magnet bearing 212 can be arranged coaxial with the mechanical load cam 214. A second mechanical load cam 216 can be coupled to the axial thrust flange 211 and the permanent magnet bearing 212. Each of the mechanical load cams 214 and 216 can be configured to provide axial force proportional to operating torque in the CVT 200. A first arrow 220 and a second arrow 222 are schematic representations of example power paths through the CVT 200 employing a permanent magnet 212 and mechanical load cams 214 and 216. An input power can be coupled to the first mechanical load cam 214 and power can be transferred out of the CVT 200 by coupling to the permanent magnet 212, or vice versa.

Turning to FIG. 5, in one embodiment, a CVT 300 is substantially similar in various aspects to the CVT 50 and the CVT 200. For simplification, only certain differences between the CVT 300 and the CVTs 50 and 200 will be described. In one embodiment, the CVT 300 is provided with a first mechanical load cam 302 operably coupled to the first traction ring 204 and to a permanent magnet bearing 304. A second mechanical load cam 306 can be coupled to the second traction ring 206 and to the torque coupling 210. During operation of the CVT 300, in one embodiment, the permanent magnet bearing 304 produces a substantially constant clamping force. The mechanical load cams 302 and 306 produce a clamping force substantially proportional to a dynamic change in the operating torque of the CVT 300.

Figure 6:
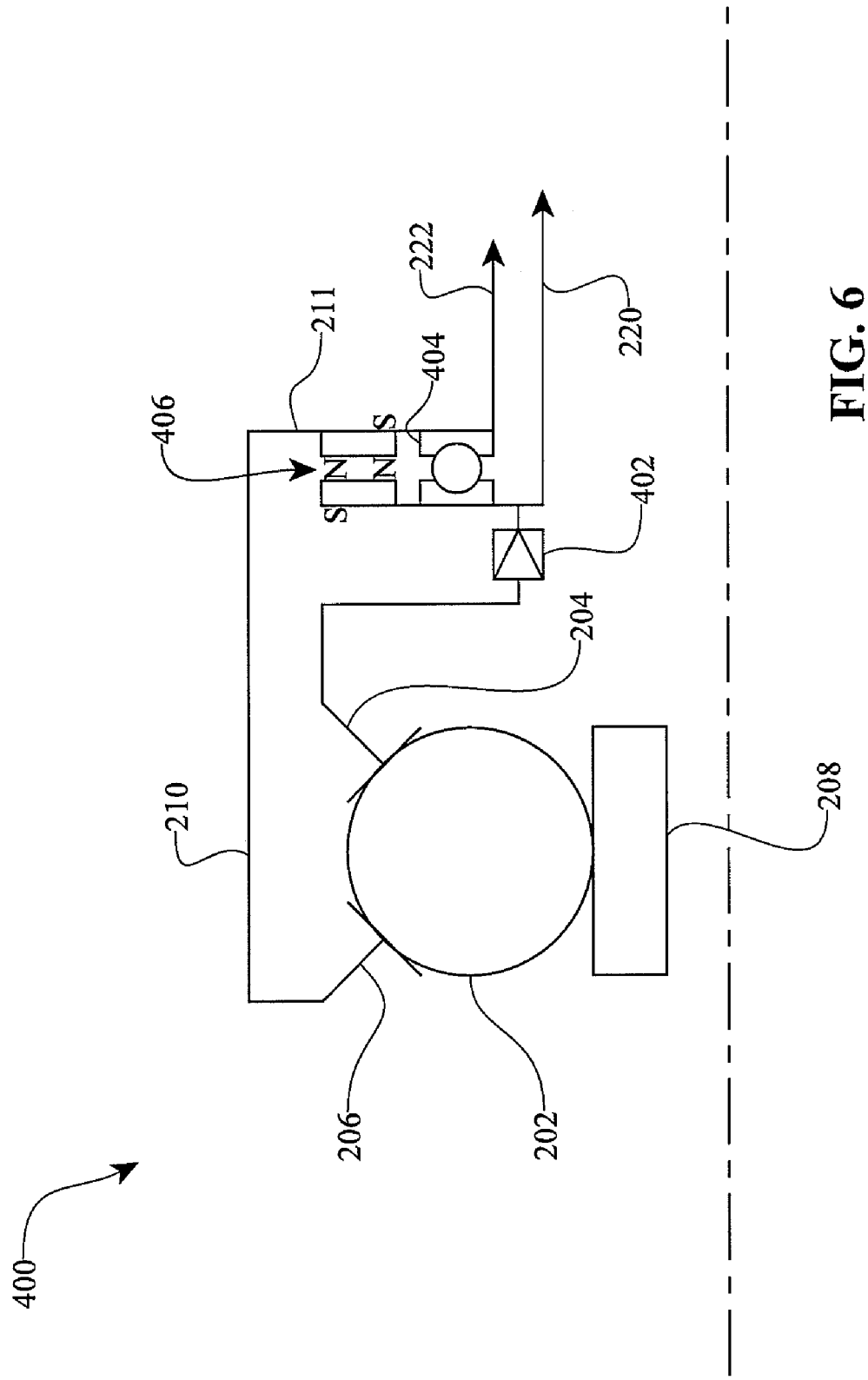
FIG. 6 is a schematic view of a CVT that uses yet another embodiment of a mechanical load cam and magnetic clamping force generation system.

Referring to FIG. 6, in one embodiment, a CVT 400 is substantially similar in certain respects to the CVT 50 and the CVT 200. For simplification, only certain differences between the CVT 400 and the CVTs 50 and 200 will be described. In one embodiment, the CVT 400 is provided with a mechanical load cam 402 coupled to the first traction ring 204. The mechanical load cam 402 can be coupled to an anti-friction bearing 404. The anti-friction bearing 404 can be further coupled to the axial thrust flange 211. A permanent magnet bearing 406 can be coupled to the first traction ring 402 and the axial thrust flange 211. In one embodiment, the permanent magnet bearing 406 is coaxial with the anti-friction bearing 404. During operation of the CVT 400, the mechanical load cam 402 can produce a clamping force proportional to an operating torque of CVT 400. The permanent magnet bearing 406 cooperates with the anti-friction bearing 404 to provide a minimum clamp force between the power rollers 202, the traction rings 204 and 206, and the idler 208.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A continuously variable transmission (CVT) having a plurality of spherical power rollers in contact with first and second traction rings and a support member, the CVT comprising:
   a permanent magnet bearing coupled to the first traction ring, the permanent magnet bearing coupled to the second traction ring;
   an electromagnetic bearing coupled to the first and second traction rings, the electromagnetic bearing configured to generate an axial force between the power rollers and the support member, and between the power rollers and the first and second traction rings, wherein the electromagnetic bearing comprises a rotor coupled to the first traction ring.

2. The CVT of claim 1, wherein the electromagnetic bearing comprises a stator operably coupled to the second traction ring.

3. The CVT of claim 1, further comprising a second permanent magnet bearing coupled to the first and second traction ring.

4. The CVT of claim 3, further comprising a lead ring positioned between the first and second permanent magnet bearings.

5. The CVT of claim 1, further comprising a first mechanical load cam coupled to the first traction ring.

6. The CVT of claim 5, wherein the first mechanical load cam is configured to receive an input power.

7. The CVT of claim 5, further comprising a second mechanical load cam coupled to the second traction ring.

8. A method of controlling an axial force in a continuously variable transmission (CVT) having a plurality of spherical power rollers in contact with a first traction ring, a second traction ring, and a support member, the method comprising the steps of:
   providing an electromagnetic bearing coupled to the first and second traction rings;

adjusting the electromagnetic bearing to provide an axial force between the power rollers and the support member, and between the power rollers and the first and second traction rings, the axial force based at least in part on an operating condition of the CVT; and coupling a permanent magnet bearing to the first traction ring.

9. The method of claim 8, wherein adjusting an axial force comprises the step of receiving an electrical signal indicative of a specified clamping force.

10. The method of claim 9, wherein the specified clamping force is based at least in part on a torque.

11. The method of claim 9, wherein the specified clamping force is based at least in part on a speed.

12. The method of claim 9, wherein coupling an electromagnetic bearing comprises the steps of coupling a rotor to the first traction ring and coupling a stator to the second traction ring.

* * * * *